(No Model.)

J. J. & D. ELLSWORTH & M. ROGERS.
SUPPORT FOR VEHICLE SHAFTS.

No. 304,922. Patented Sept. 9, 1884.

WITNESSES
Jno. E. Stiles.
N. S. Wright.

John J. Ellsworth
DeWitt Ellsworth
Morris Rogers
By C. W. Leggett,
Attorney

INVENTORS

UNITED STATES PATENT OFFICE.

JOHN J. ELLSWORTH, DEWITT ELLSWORTH, AND MORRIS ROGERS, OF RIVERDALE, MICHIGAN.

SUPPORT FOR VEHICLE-SHAFTS.

SPECIFICATION forming part of Letters Patent No. 304,922, dated September 9, 1884.

Application filed June 18, 1884. (No model.)

*To all whom it may concern:*

Be it known that we, JOHN J. ELLSWORTH, DEWITT ELLSWORTH, and MORRIS ROGERS, of Riverdale, county of Gratiot, State of Michigan, have invented a new and useful Improvement in Shaft-Supporters; and we declare the following to be a full, clear, and exact description of the same, such as will enable others skilled in the art to which it pertains to make and use it, reference being had to the accompanying drawings, which form a part of this specification.

Our invention consists of the combinations of devices and appliances hereinafter specified, and more particularly pointed out in the claims.

Figure 1:
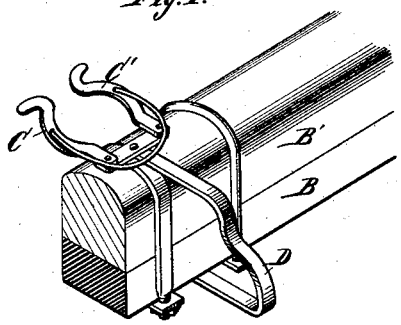
Figure 2:
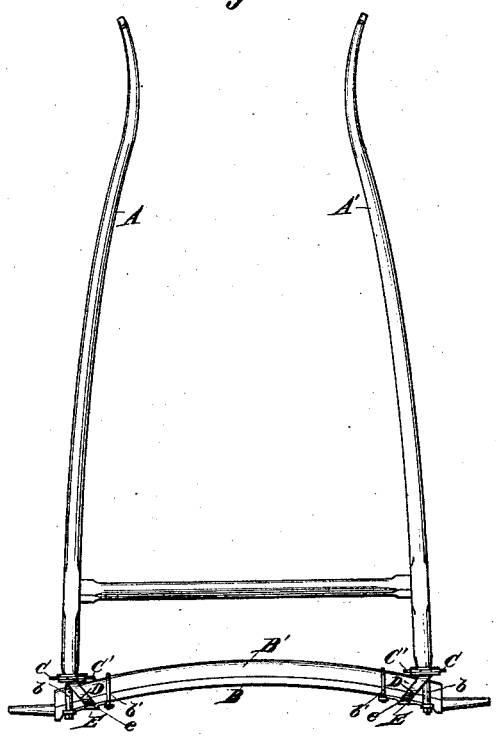

In the drawings, Figure 1 is a perspective view of a device embodying our invention. Fig. 2 is a rear elevation.

Our invention relates to an improvement in vehicle-shaft supporters, and is more particularly designed as an improvement upon United States Letters Patent granted to John J. Ellsworth, July 3, 1883, No. 280,459, our object being to support the jaws of the shaft-supporter upon movable arms, to more fully adapt the device to receive any kind of shafts.

A A' represent the shafts; B, the axle; B', the head-block.

C C' represent our movable jaws, constructed in the manner described in the patent referred to. Instead, however, of securing said jaws beneath a clip, as therein shown and described, we provide a bent arm or stirrup, D, for this purpose. The cross-piece, to which the jaws are pivoted at their rear ends, may be made integral with said stirrup, or it may be bolted thereto in any suitable way, as may be desired.

E represents a grooved or slotted bar, which we have shown located beneath the axle, and held in place by the clips *b* and *b'*. This bar may have, however, any desired location and may be held in place in any desired way. Through the slot *e* of this bar the lower and free extremity of the stirrup is inserted, the construction being such that said stirrup may be moved, so as to project the jaws forward or backward so as to engage shafts of various constructions. This bar may of course be shifted laterally so as to bring the jaws to the desired position, as well as enabling the jaws to be projected forward and backward. When the jaws have been located in the proper position, by tightening up the nut on the clip, it will be held firmly in place. This enables us to more readily adjust and arrange the device upon different vehicles.

The stirrups may be made of malleable iron or other material.

We do not limit ourselves to the use of the slotted bar E for holding the stirrup in adjustable connection upon the axle, as it is evident that other means might be employed to accomplish the same purpose—as, for instance, the end of the arm may be slotted and secured in place by a bolt passed through the slotted end of the arm.

What we claim is—

1. The combination, with the jaws C C', of a supporting-arm, D, adapted to be adjustably connected to the vehicle, substantially as described.

2. The combination, with a vehicle, of a supporting-arm, D, adjustably secured at one end, said arm provided at the opposite end with the jaws C C', substantially as described.

3. The combination, with the axle and head-block, of the slotted bar E, held in place by suitable clips, a supporting-arm adjustably connected with said slotted bar, said arm provided with the jaws C C', substantially as and in the manner described.

In testimony whereof we sign this specification in the presence of two witnesses.

JOHN J. ELLSWORTH.
    DEWITT ELLSWORTH.
    MORRIS ROGERS.

Witnesses:
  EDGAR BERRY,
  MORRIS DUNN.